United States Patent
Oltmanns et al.

(10) Patent No.: US 6,223,359 B1
(45) Date of Patent: May 1, 2001

(54) AUTOMATIC WATER LEVEL SYSTEM FOR SWIMMING POOLS

(76) Inventors: Lonny W. Oltmanns, 5805 El Camino Ave., Bakersfield, CA (US) 93313; Randy J. Garcia, P.O. Box 1856, Pioneer, CA (US) 95666

( * ) Notice: Subject to any disclaimer, the term of this patent is extended or adjusted under 35 U.S.C. 154(b) by 0 days.

(21) Appl. No.: 09/511,067

(22) Filed: Feb. 23, 2000

Related U.S. Application Data

(60) Provisional application No. 60/122,106, filed on Feb. 26, 1999.

(51) Int. Cl.$^7$ ........................................ E04H 4/00
(52) U.S. Cl. ................... 4/508; 4/507; 137/392
(58) Field of Search ........................ 4/508, 507; 137/392, 137/403, 434, 449, 563

(56) References Cited

U.S. PATENT DOCUMENTS

| | | | |
|---|---|---|---|
| 4,817,217 | * | 4/1989 | Lively .................................... 4/508 |
| 5,247,710 | * | 9/1993 | Carder et al. ........................... 4/508 |

* cited by examiner

Primary Examiner—Gregory L. Huson
Assistant Examiner—Tuan Nguyen

(57) ABSTRACT

An automatic water level system having a pair of micro-switches nested within a substantially cylindrically shaped primary housing having a first and second end for electrical lead lines. The primary housing is disposed within a cavity of a substantially cylindrical, T-shaped secondary housing or baffle including a mounting assembly. Each electrical lead line is a water resistant control line, which extend from an end of the pair of micro-switches disposed within the primary housing to a remote control unit via the first and second ends. The control lines are optionally recessed within a cavity of the secondary housing for connection to a remote control unit, which activates a fluid supply valve and/or a drain valve. The secondary housing further includes a first and second cap having concentric apertures and the respective caps are removably secured to the housing. The external portion of the secondary housing includes a mounting bracket and faceplate for attachment with an existing interior wall portion of a pool via epoxy or mechanical reinforced fasteners. Each primary and secondary housing has a wall thickness, which minimizes material use according to a predetermined pressure gradient.

10 Claims, 4 Drawing Sheets

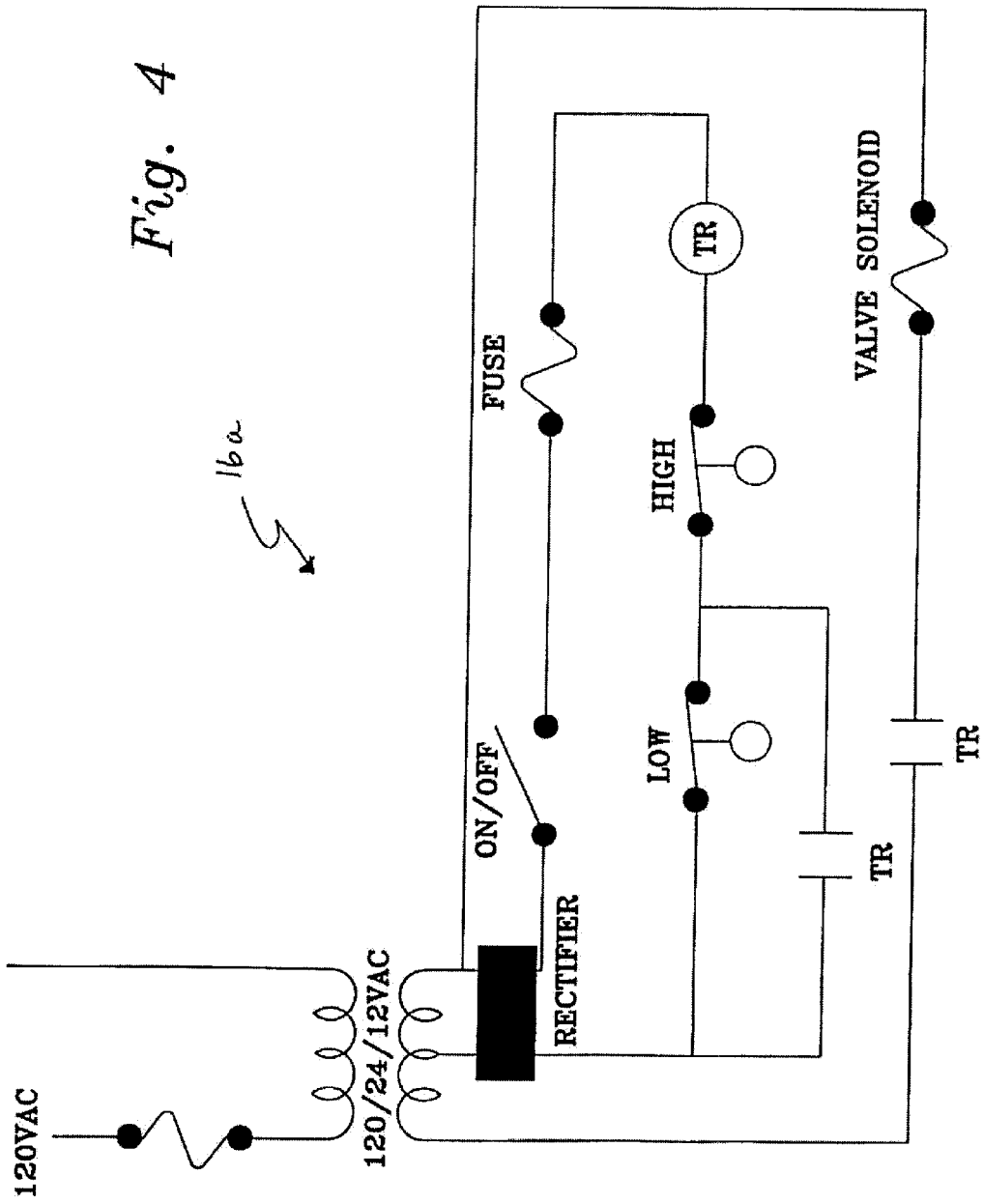

AUTOMATIC WATER LEVEL SYSTEM FOR SWIMMING POOLS

This application claims the benfit of U.S. Provisional No. 60/122,106 filed Feb. 26, 1999.

BACKGROUND OF THE INVENTION

1. Field of the Invention

The present invention relates generally to a fluid level device. More specifically, the invention is a fluid level detector system, which automatically controls the water level in a reservoir or swimming pool.

2. Description of Related Art

Various fluid level devices have been devised for automatically detecting a particular water level including options for activating water valves for supplying or releasing water from a swimming pool or reservoir. Most of the conventional systems are antiquated and suffer from a number of mechanical problems associated with material degradation from rust and corrosion, increased maintenance and monitoring, and escalating costs associated therewith. Complex circuitry has also made some of the more advanced water level detector systems unaffordable and/or technically challenging to use or install by a novice and/or professional alike. An automatic water level system, which is impervious to the aforementioned problems, is lacking to say the least.

For example, U.S. Pat. No. 705,421 issued to Moore discloses a water level testing device for boilers. The device embodies a water gauge having contact points, which activate and deactivate an audio or bell circuit for signaling a certain water level reached. A float mechanism rises or falls within a glass gauge-tube to indicate whether water within the boiler is above or below a certain height. When the desired height is reached the audio signal or bell ringing ceases. If the condition indicated by the audio signal remains the same, the device is manually corrected if at all possible. The automatic water level detector according to the invention herein described does not require manual signal corrections.

U.S. Pat. No. 1,414,298 issued to Montero discloses a similar fluid level indicator for a gas tank, which utilizes a float switch for activating a light terminal when the tank is fully charged. The light will remain on until the quantity of gasoline has diminished to an extent to break the contact between two opposing terminals. A series of makers and breakers made up of an electromagnet, a swing armature, a latch spring, a gravitating annunciator, and a vertically swinging link are attached through the annunciator, which is connected with the magnet frame. Mechanical elements such as latch springs and swinging links are prone to failure due to material degradation from corrosion or similar effects, which produces resistive forces in the form of friction, which inhibit proper movement between mating parts.

U.S. Pat. No. 1,588,877 issued to Donahue discloses a water supply regulator comprising a manually actuated switching means for setting the water level. A "make and brake" circuit similar to that taught by Montero is connected to a feed-water control means and semaphore lights. This system like that of Montero suffers also from material degradation. Unlike the instant invention, the water supply regulator of Donahue uses float balls to make and break the continuity of the various electrical circuits. U.S. Pat. No. 4,607,399 issued to Yovanofski teaches a similar water regulator apparatus, except two vertical pipes indicate the pool water level. Each pipe has an anchored ball switch, which rise and fall activating either pool draining or pool filling operations.

U.S. Pat. No. 1,800,378 issued to Everson discloses a circulating water level control unit having overflow gutters with three external armature controlled ball float valves disposed within and overflow reservoir which actuate the opening and closing of various valves. The automatic water level system according to the instant invention does not require the use of ball control valves as such. A single water detector system is mounted within an interior wall of a swimming pool for simple water level detection and control. U.S. Patents by Schmidt (U.S. Pat. No. 3,739,405), Grewing (U.S. Pat. No. 3,908,206), Thorn et al. (U.S. Pat. No. 4,081,638), Baruch (U.S. Pat. No. 3,673,587) and Page (U.S. Pat. No. 3,759,286) teach similar fluid level indicators having an adjustable ball or similar control float valves as taught by Everson.

U.S. Pat. No. 4,342,125 issued to Hodge discloses a water level control device for swimming pools having a casing for attachment to or suspension on a ladder. The internal fluid level detector is a float detector, which is aligned by a vertical post and linkage mechanism for slidably rising and falling in response to different water levels. Brackets attached on the interior wall surfaces of the casing mount the switch. A water supply channel is coupled thereto for supplying water within the casing through a central portion of the brackets and float linkage device. The float linkage is simply an armature linkage, which requires adjustments or constant calibration for effective level detection. The automatic water level device according to the invention does not require the use of an armature control linkage.

U.S. Pat. No. 4,380,091 issued to Lively discloses a circuit for automatically controlling the water level of swimming pools by means of a multi-level detecting sensor, which directly senses the pool water. A low voltage oscillator in the input portion of the circuitry detects the presence of water above or below each level, sensing electrical contact of the sensor by a change in oscillator amplitude in response to impedance from the contact to ground. A plurality of sensor probes are linearly arranged to detect different levels of water within a pool. The system is completely sealed to prevent water contact with electrical lines.

U.S. Pat. No. 4,483,192 issued to Wachter discloses a multi-level detector for a nuclear reactor vessel comprising a plurality of vertically spaced cantilevered mounted spring members. The free end of each spring member is connected to a depending float member with strain gauges attached thereto. The strain gauges indicate the instantaneous position of the spring member and thereby provide an indication of the instantaneous water level. This system is structurally different and operates under a different principle as that taught by the invention. Accordingly, there is no need for strain gauges or cantilevered spring elements to sense a particular fluid level.

U.S. Pat. No. 4,612,949 issued to Henson discloses an apparatus for controlling the level of fluid in a reservoir. The apparatus utilizes a fluid sensing probe with circuitry that compensates for swells and other surface undulations, which mask the true fluid level. A single probe is mounted within a cavity of a pool wall or on the surface of the wall. A threaded probe is attached within a central portion of a cylindrical housing and disposed in a fixed position to detect a certain water level. The free end of the threaded probe triggers a control circuit via an electrical line for electrically activating a water valve to supply water to a pool according to a predetermined water level or condition. Inserting a circular wire lead over the top portion of the threaded probe and mechanically securing it by a nut and bolt type fastener makes the electrical connection. There is no anti-splash protection for this particular system and constant mechanical adjustments are needed for estimating an acceptable water limit for the system. The electrical circuit suffers from flip flopping signals attributed to water splashing, etc. The automatic water level detector according to the invention does not require the use of mechanical fasteners for direct connection with the water detector, and is impervious to splashing and/or water swells.

The following Foreign Pats. by Ranshofen-Berndorf (NR 228448), Meyer et al. (DE 2912383), Hanai (JP 5742815) and Bush et al. (GB 2086576) disclose water level features of general relevance to the automatic water level detector according to the invention. In particular, the Russian Pat. issued to Bush et al. (GB 2,086,576) discloses a fluid level-monitoring device adapted for monitoring the level of fluid in a fuel tank or enclosed vessel. The device contains a plurality of float switches or ball type floatable switches set in series and are connected to lamps to indicate a warning signal for critical changes in fluid levels.

The automatic water level system of the instant invention is different from the prior and related art, in that it provides water level detecting without the use of ball floats and associated mechanical linkages and/or armatures. A nested detector housing structure is provided to correct for level detector inaccuracies attributed to splashing or water swells. The level detection portion of the system is easily installed via epoxy to an existing interior pool wall without the need for structural modifications to the surface. None of the above inventions and patents, taken either singly or in combination, is seen to describe the instant invention as claimed.

BRIEF SUMMARY OF THE INVENTION

The automatic water level system according to the invention has a pair of micro-switches nested within a substantially cylindrically shaped primary and secondary housing or micro-chamber having a first and second end for electrical leads lines. The primary housing is disposed within a cavity of a substantially cylindrical T-shaped secondary housing which includes a mounting assembly. Each lead line from the primary housing is a water resistant control line which extend from a respective end of the pair of micro-switches fluidly disposed within the primary housing to a remote control unit via the first and second ends. The control lines are optionally recessed within a cavity of the secondary housing as a hidden connection to a remote control unit, which activates a fluid supply valve. The secondary housing further includes a first and second top having concentric apertures secured thereto. The external portion of the secondary housing includes a mounting bracket and faceplate for attachment with an existing interior wall portion of a pool. Each primary and secondary housing has a wall thickness, which minimizes material use according to a predetermined pressure gradient. A series of threaded apertures are disposed within the faceplate for adjustable mounting of the nested water level detector in a pool.

Accordingly, it is a principal object of the invention to provide an automatic water level system that maintains a specific water level in swimming pools with reduced material and component use.

It is another object of the invention to provide an automatic water level system that is impervious to material degradation due to the effects of rust and corrosion.

It is a further object of the invention to provide an automatic water level system that is wave and splash resistant.

Still another object of the invention is to provide an automatic water level system which is simple to use and easy to install.

It is another object of the invention to provide an automatic water level system that can be used on new or existing pools, as well as above ground and in ground pools.

It is an object of the invention to provide improved elements and arrangements thereof in an apparatus for the purposes described which is inexpensive, dependable, compact in size and fully effective in accomplishing its intended purposes.

These and other objects of the present invention will become readily apparent upon further review of the following specification and drawings.

BRIEF DESCRIPTION OF THE DRAWINGS

FIG. 4 is a control circuit for the automatic water level system according to the invention.

Similar reference characters denote corresponding features consistently throughout the attached drawings.

DETAILED DESCRIPTION OF THE PREFERRED EMBODIMENTS

The present invention is directed to an automatic fluid level control system for swimming pools or reservoirs. The preferred embodiments of the present invention are depicted in FIGS. 1–4, and are generally referenced by numeral 5.

Figure 1:
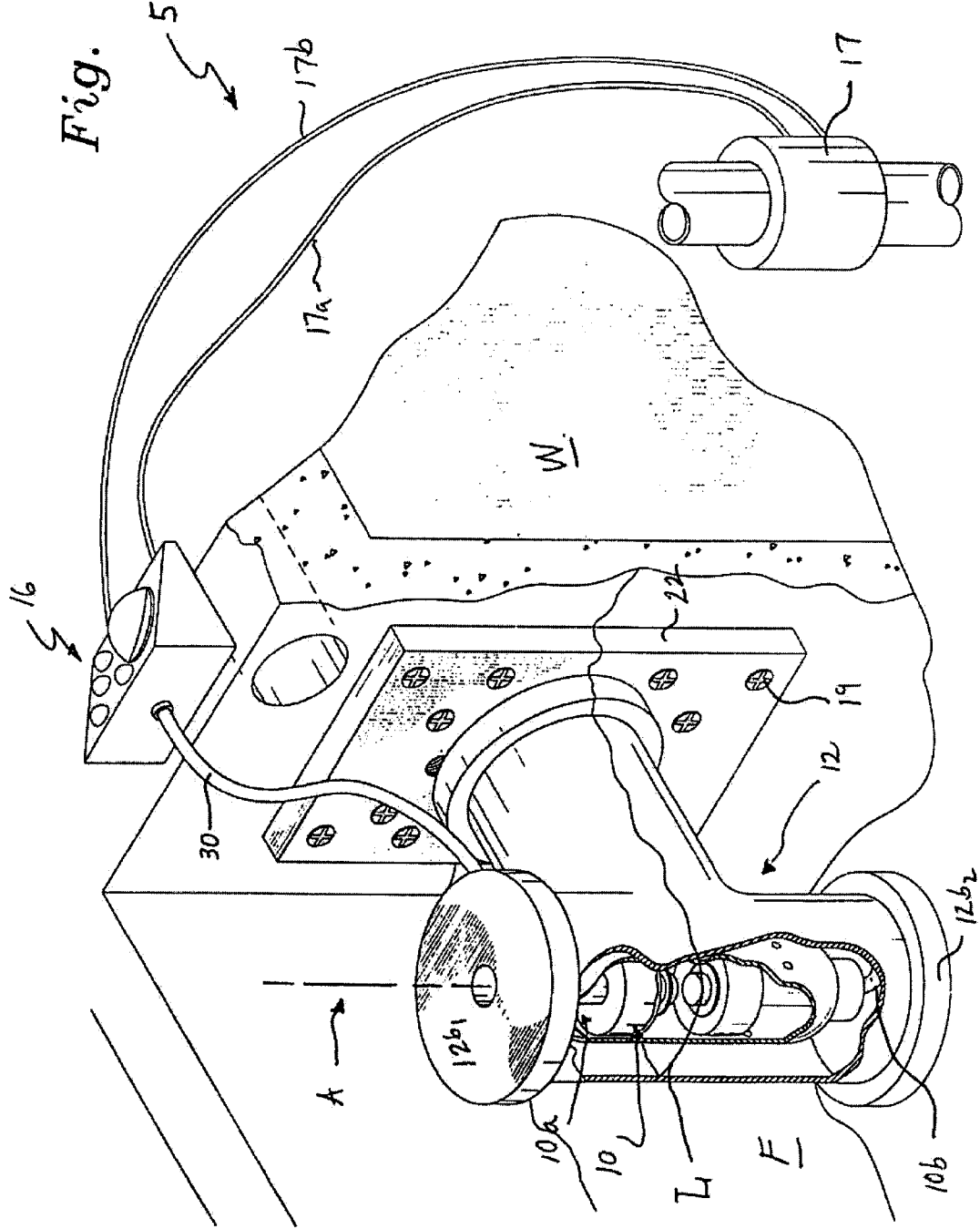
FIG. 1 is an environmental, perspective view of an automatic water level system for a swimming pool according to the present invention.

As best seen in FIG. 1, the automatic fluid level control system for swimming pools comprises a fluid level detector 10 having first 10a and second 10b water resistant electrical lead lines, a nested fluid level detector housing 12, a mounting means 14 (See FIG. 2) for mounting the housing within a reservoir, and a power control means 16 for controlling fluid flow to and from a reservoir. The control means 16 further comprises a time relay circuit 16a for controlling the fluid flow time when the water level is below a desired level (See FIG. 4). The control system can also be adapted to control the release of water from a drain (not shown) in the event the water level goes beyond a predetermined level L.

Figure 2:
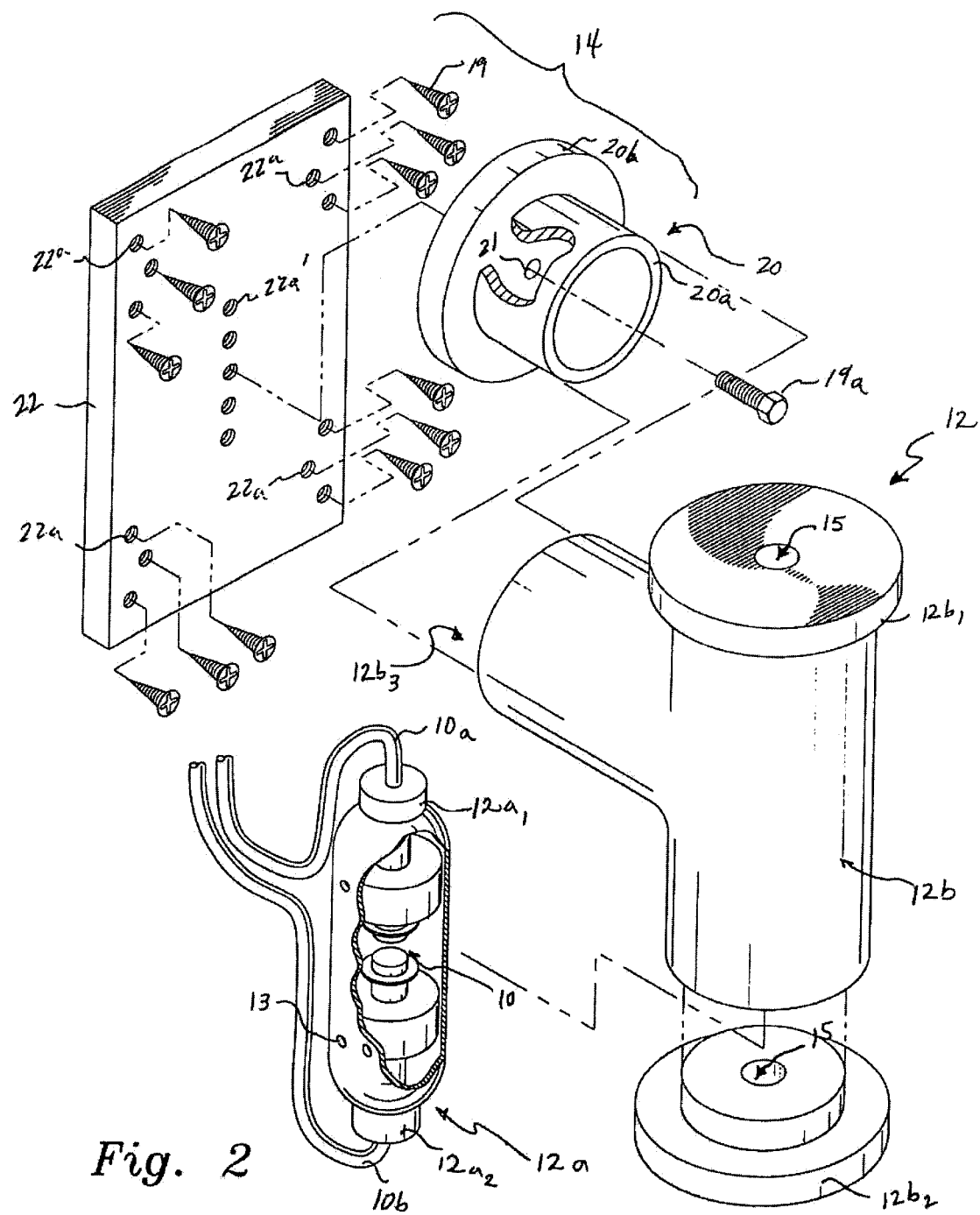
FIG. 2 is an exploded perspective view of the automatic water level system according to the invention, illustrating a particular attachment arrangement.
Figure 3:
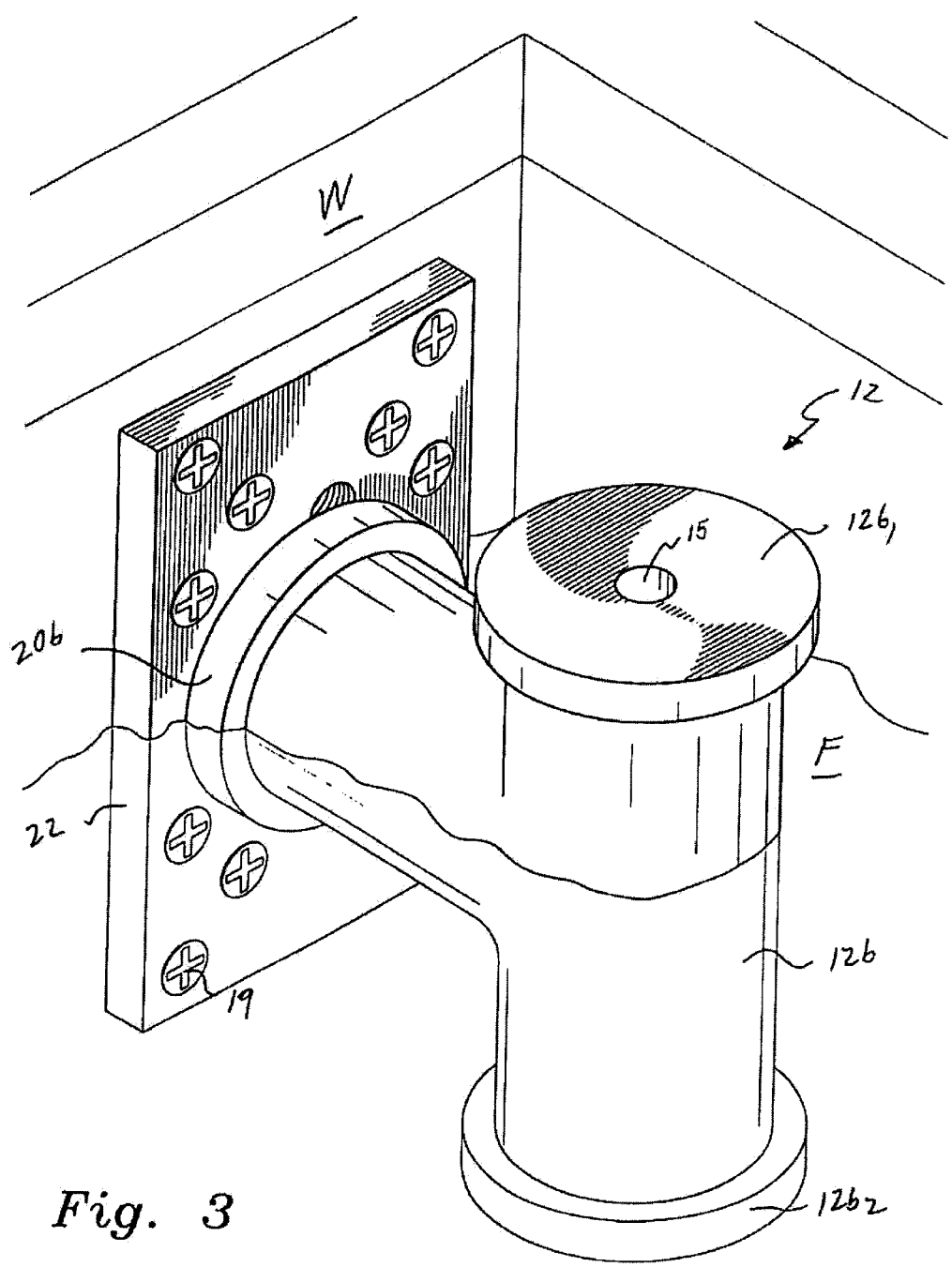
FIG. 3 is an environmental perspective view of the automatic water level system according to FIG. 2, illustrating a specific reservoir water level.

As best seen in FIG. 2, the detector housing 12 includes a primary 12a and a secondary 12b containment micro-chamber. The primary micro-chamber 12a is an inner chamber having the detector 10 disposed therein. The micro-chamber 12a further includes a first $12a_1$ and second $12a_2$ containment end for transmitting detected water in the form of electrical signals from the respective first and second electrical lead lines 10a and 10b to a remote control unit 16 (See FIG. 1). The primary micro-chamber 12a further comprises a plurality of apertures 13 for fluid passage.

The secondary micro-chamber 12b is an outer chamber for mounting and serves to baffle or reduce splashing within the detecting vicinity. The micro-chamber 12b encompasses the primary micro-chamber 12a, which is fluidly and mechanically disposed therein. The secondary micro-chamber 12b is defined by a volume greater than the volume of the primary micro-chamber 12a, such that the ratio of the respective volumes a nested micro-chamber arrangement wherein the primary micro-chamber 12a is substantially vertically disposed within the secondary micro-chamber 12a, and is substantially co-linear with a common central axis A (See FIG. 1) shared by both the primary and secondary micro-chambers 12a and 12b, respectively.

Accordingly, the secondary micro-chamber 12b further comprises removable first $12b_1$ and second $12b_2$ removable ends. A third end $12b_3$ is also illustrated for mounting housing 12. Each removable first $12b_1$ and second $12b_2$ end further includes at least one aperture 15 centrally disposed therein for fluid passage. When completely mounted to an interior pool wall W, fluid F passes within and around the housing 12 of the automatic fluid level control system 5. As diagrammatically illustrated in FIG. 1, one embodiment of mounting the water level detector housing 12 is shown. The mounting means 14 according to the invention is preferably a mounting assembly comprising a substantially cylindrical cap 20 for insertable attachment to the third end $12b_3$ of the secondary micro-chamber 12b, and a face-plate 22 having a plurality of threaded apertures 22a conveniently sized for mounting or mechanically fastening the faceplate 22 to the interior wall W (See FIG. 1). It would be obvious to one of ordinary skill in the art to provide any number of mechanical fasteners 19 such as nut and bolt fasteners, etc. for attaching the housing 12 and mounting assembly 14 to a wall W (See FIG. 1) as desired. The preferred method of securing the automatic fluid level control system 5 to an interior wall W (See FIG. 1) of a pool or reservoir is by chemical bonding compound or agents such as epoxy or similar chemical bonding agents.

The cap 20 further comprises a first 20a and a second 20b end, wherein the second 20b end includes a centrally disposed aperture 21 which aligns with and is mechanically secured to at least one of the plurality of threaded apertures 22a conveniently sized on the faceplate 22. This attachment is more clearly illustrated in FIG. 2. The first end 20a of the cap 20 is made as an insertable end for insertable attachment with the third end $12b_3$ of the secondary micro-chamber 12b. A central line or series of apertures 22a' are disposed within the faceplate for vertical adjustments of the housing 12 accordingly.

The second end 20b of the cap 20 mechanically attaches to at least one of the plurality of threaded apertures by a threaded mechanical fastener 19a or alternatively by chemical bonding via epoxy, etc. Other advantages of the invention includes wherein the fluid level detector housing 12 is a substantially T-shaped cylindrical housing. This particular arrangement makes mounting and removing the inner detector micro-chamber 12a simple and easy. According to the first embodiment a single line 30 transmits water level signals as an external attached line to a control unit 16 located at the surface level or a remote location. As diagrammatically illustrated in FIG. 3, the wiring attachment and mounting is disclosed as a completely hidden operative attachment (not shown) to a remote controller unit 16. The control unit 16 is sequentially electronically attached to lines 17a and 17b for activating a fluid flow/drain control valve 17.

The most significant advantage is the detector housing is sized to fit in the palm of an average persons hand. This is certainly important for manufacturing the system 5 with reduced material requirements. In addition, the substantially T-shaped cylindrical housing has the advantage of allowing for substantial wall thickness ranges to conform to a predetermined pressure gradient. This is particularly significant for preventing collapsing or buckling in the material. The material of the substantially T-shaped cylindrical housing is preferably a weather resistant plastic material such as polyvinyl chloride (PVC). Other material such as those for the mechanical fasteners will also be weather resistant or impervious to the effects of rust and corrosion.

It is to be understood that the present invention is not limited to the embodiments described above, but encompasses any and all embodiments within the scope of the following claims.

We claim:

1. An automatic fluid level control system for swimming pools comprising:

A fluid level detector having first and second electrical lead lines, a nested fluid level detector housing, said housing having a primary and a secondary containment micro-chamber, the primary micro-chamber is an inner chamber having the detector disposed therein, and a first and second containment end for transmitting electrical signals from the respective first and second electrical lead lines attached to the detector to a remote control unit, said primary micro-chamber further comprises a plurality of apertures for fluid passage;

The secondary micro-chamber is an outer chamber comprising the primary micro-chamber fluidly and mechanically disposed therein, said secondary micro-chamber having a volume greater than a volume of the primary micro-chamber, such that the ratio of the respective volumes maintains a substantially vertically disposed primary micro-chamber within said secondary micro-chamber, and said vertically disposed micro-chamber further being substantially co-linear therewith, the secondary chamber further comprises first and second removable ends, and a third end for mounting, each removable first and second end further includes at least one aperture centrally disposed therein for fluid passage;

A mounting means for mounting the housing within a reservoir; and

A power control means for controlling fluid flow to and from a reservoir, wherein said control means further comprises a time relay circuit for controlling the fluid flow time.

2. The automatic fluid level control system for swimming pools according to claim 1, wherein said fluid level detector housing is a substantially T-shaped cylindrical housing.

3. The automatic fluid level control system for swimming pools according to claim 2, wherein said substantially T-shaped cylindrical housing has a wall thickness according to predetermined pressure gradient.

4. The automatic fluid level control system for swimming pools according to claim 2, wherein said substantially T-shaped cylindrical housing is made of a weather resistant plastic material.

5. The automatic fluid level control system for swimming pools according to claim 4, wherein said weather resistant plastic material is polyvinyl chloride.

6. The automatic fluid level control system for swimming pools according to claim 1, wherein said mounting means is a mounting assembly comprising a substantially cylindrical cap for insertable attachment to said third end of said secondary micro-chamber, and a faceplate having a plurality of threaded apertures for mounting the cap to said plate.

7. The automatic fluid level control system for swimming pools according to claim 6, wherein the first end of said cap being an insertable end for insertable attachment with said third end of said secondary micro-chamber.

8. The automatic fluid level control system for swimming pools according to claim 6, wherein the second end of the cap includes a centrally disposed aperture which aligns with and mechanically attaches to said face plate to at least one of said plurality of threaded apertures by a threaded bolt fastener.

9. The automatic fluid level control system for swimming pools according to claim 1, wherein said mounting means is attached to said reservoir by epoxy.

10. The automatic fluid level control system for swimming pools according to claim 1, wherein said mounting means is attached to said reservoir by mechanical fasteners.

* * * * *